United States Patent [19]
Furuhashi et al.

[11] Patent Number: 4,727,049
[45] Date of Patent: * Feb. 23, 1988

[54] CATALYST COMPONENT FOR POLYMERIZATION OF OLEFINS

[75] Inventors: Hiroyuki Furuhashi; Tadashi Yamamoto; Masafumi Imai; Hiroshi Ueno, all of Saitama, Japan

[73] Assignee: Toa Nenryo Kogyo Kabushiki Kaisha, Tokyo, Japan

[*] Notice: The portion of the term of this patent subsequent to Sep. 23, 2003 has been disclaimed.

[21] Appl. No.: 752,421

[22] Filed: Jul. 5, 1985

[30] Foreign Application Priority Data

Jul. 9, 1984 [JP] Japan ................... 59-140567

[51] Int. Cl.$^4$ .................... C08F 4/02; C08F 4/64
[52] U.S. Cl. ..................... 502/115; 502/120; 502/113; 502/125; 502/126; 502/127; 526/97; 526/124; 526/129
[58] Field of Search ............... 502/113, 115, 120, 121, 502/122, 123, 125, 126, 127

[56] References Cited

U.S. PATENT DOCUMENTS

| 3,825,524 | 7/1974 | Wada et al. ................. 502/125 |
| 4,180,636 | 12/1979 | Hirota et al. ............ 252/429 B |
| 4,252,670 | 2/1981 | Caunt et al. ................. 526/127 |
| 4,301,029 | 11/1981 | Caunt et al. ............ 252/429 B |
| 4,393,182 | 7/1983 | Goodall et al. ............... 502/127 |
| 4,414,132 | 11/1983 | Goodall et al. ............... 502/127 |
| 4,431,568 | 2/1984 | Miya et al. ................... 526/127 |
| 4,442,276 | 4/1984 | Kashiwa et al. ............... 502/127 |
| 4,471,066 | 9/1984 | Sakurai et al. ............... 526/127 |
| 4,549,001 | 10/1985 | Martin ....................... 502/127 |
| 4,613,579 | 9/1986 | Furuhashi et al. ............. 526/143 |

FOREIGN PATENT DOCUMENTS 2101610 1/1983 United Kingdom .

Primary Examiner—Edward J. Smith
Attorney, Agent, or Firm—M. B. Kurtzman

[57] ABSTRACT

A catalyst component for the polymerization of olefins which is prepared by contacting (1) a contact reaction product of (a) a metal oxide, (b) a dihydrocarbyl magnesium, and (c) a halogen-containing alcohol held with (d) an electron-donating compound, and (e) a titanium compound.

20 Claims, No Drawings

CATALYST COMPONENT FOR POLYMERIZATION OF OLEFINS

FIELD OF THE INVENTION

This invention relates to a catalyst component for the polymerization of olefins and, to the catalyst system comprising the catalyst component, and to the process of polymerizing olefins, especially olefins having 3 or more carbon atoms, in the presence of the catalyst system.

BACKGROUND OF THE INVENTION

Concerning Ziegler-Natta type catalysts which are effective in polymerizing olefins, catalyst components having transition metals deposited on a variety of carriers have been developed for the purpose of improving catalyst activity per unit amount of catalyst or decreasing residues originating in catalyst and persisting in produced polymer.

A plurality of catalyst components using silica, alumina, and other similar metal oxides as carriers for deposition of transition metals have been proposed. Most of them are intended for polymerization of ethylene. A very few of them are intended for polymerization of alpha-olefins such as propylene.

As concerns catalyst compositions for the polymerization of propylene, a catalyst component comprising a reaction product of a metal oxide and a magnesium dialkoxide brought in contact with an electron-donating compound and a tetravalent titanium halide (specification of Japanese patent application Laid-open No. SHO 58[1973]-162,607) and a catalyst component comprising a reaction product of an inorganic oxide and a magnesium hydrocarbyl halide compound brought in contact with a Lewis base compound and titanium tetrachloride (specification of Japanese patent application Laid-open No. SHO 55[1980]-94,909) are known to the art. These catalyst components, however, can hardly be called satisfactory in terms of activity and stereoregularity.

Further, a catalyst component obtained by causing a hydrocarbyloxysilane to react with a reaction product of a porous carrier such as silica and an alkyl magnesium compound and subsequently causing a titanium halide compound to react upon the resultant reaction product (specification of Japanese patent application Laid-open No. SHO 57[1982]-153,006) and a catalyst component obtained by causing an organic metal compound to react with a porous carrier, causing a hydrocarbyl alcohol to react with the resultant reaction product, and then causing a titanium halide compound to react with the reaction product (specification of Japanese patent application Laid-open No. SHO 57[1982]-200,408) have been proposed. These catalyst components are intended for homopolymerization of ethylene or for copolymerization of ethylene with other olefins. They are not suitable for polymerization of alpha-olefins such as propylene.

DISCLOSURE OF THE INVENTION

Object of the Invention

It is an object of this invention to provide a catalyst component which uses a metal oxide as a carrier and which is used for homopolymerization of an olefin exhibiting high activity and high stereoregularity, particularly an alpha-olefin such as propylene, and for copolymerization of the aforementioned olefin with other olefins. More particularly, in accordance with an object of this invention there is provided a catalyst component which is prepared by contacting a contact reaction product of a metal oxide, a dihydrocarbyl magnesium, and a halogen-containing alcohol held in contact with an electron-donating compound and a titanium compound fulfills the object of this invention. This discovery has led to perfection of this invention.

SUMMARY OF THE INVENTION

To be specific, this invention essentially concerns a catalyst component for the polymerization of olefins which is prepared by contacting a contact reaction product of (1) (a) a metal oxide, (b) a dihydrocarbyl magnesium, and (c) a halogen-containing alcohol held with (2) (d) an electron-donating compound and (e) a titanium compound.

Raw materials for Preparation of catalyst component

(A) Metal Oxide

The metal oxide to be used in this invention is the oxide of an element selected from the class of elements belonging to Groups II through IV in the Periodic Table of Elements. Examples of the oxide are $B_2O_3$, MgO, $Al_2O_3$, $SiO_2$, CaO, $TiO_2$, ZnO, $ZrO_2$, $SnO_2$, BaO, and $ThO_2$. Among other oxides enumerated above, $B_2O_3$, MgO, $Al_2O_3$, $SiO_2$, $TiO_2$, and $ZrO_2$ are more desirable selections, and $SiO_2$ is the most desirable selection. Further, composite oxides including these metal oxides are also usable. Examples of these composite oxides are $SiO_2$-MgO, $SiO_2$-$Al_2O_3$, $SiO_2$-$TiO_2$, $SiO_2$-$V_2O_5$, $SiO_2$-$Cr_2O_3$, and $SiO_2$-$TiO_2$-MgO.

The aforementioned metal oxides or composite oxides described above are fundamentally desired to be an anhydride. It, however, tolerates inclusion of a hydroxide in a very small amount normally entrained in the metal oxide of the class under discussion. It also tolerates inclusion therein of impurities to an extent incapable of appreciably impairing the nature of metal oxide. Examples of the impurities so tolerated are oxides, carbonates, sulfates, and nitrates such as sodium oxide, potassium oxide, lithium oxide, sodium carbonate, potassium carbonate, calcium carbonate, magnesium carbonate, sodium sulfate, aluminum sulfate, barium sulfate, potassium nitrate, magnesium nitrate, and aluminum nitrate.

Generally, the metal oxide of the foregoing description is used in the form of powder. The size and shape of the individual particles of this powder are desired to be suitably adjusted because they often have bearing on the shape of the olefin polymer to be produced. Prior to use, this metal oxide is fired at as high a temperature as permissible as for the purpose of expelling poisoned substance and then held so as not to be exposed directly to the atmosphere.

(B) Dihydrocarbyl Magnesium

The dihydrocarbyl magnesium to be used in the present invention (hereinafter referred to as "organic Mg") is represented by the general formula, RMgR'. In this formula, R and R', which can be the same or different, denote an alkyl, cycloalkyl, aryl, or aralkyl group of 1 to 20 carbon atoms.

Examples of the organic Mg are dimethyl magnesium (hereinafter "magnesium" will be abbreviated "Mg"), diethyl Mg, ethylmethyl Mg, dipropyl Mg, diisopropyl Mg, ethylpropyl Mg, dibutyl Mg, diisobutyl Mg, di-secbutyl Mg, di-tert-butyl Mg, butylethyl Mg, butylpropyl Mg, sec-butylethyl Mg, tert-butylisopropyl Mg, sec-butyl-tertbutyl Mg, dipentyl Mg, diisopentyl Mg, ethylpentyl Mg, isopropylpentyl Mg, sec-butylpentyl Mg, dihexyl Mg, ethylhexyl Mg, butylhexyl Mg, tert-butylhexyl Mg, (2-ethylbutyl)ethyl Mg, (2,2-diethylbutyl)ethyl Mg, dioctyl Mg, di-2-ethylhexyl Mg, diheptyl Mg, didecyl Mg, dicyclohexyl Mg, cyclohexylethyl Mg, butylcyclohexyl Mg, di(methylcyclohexyl) Mg, diphenyl Mg, ethylphenyl Mg, butylphenyl Mg, sec-butylphenyl Mg, ditolyl Mg, ethyltolyl Mg, dixylyl Mg, dibenzyl Mg, benzyl-tert-butyl Mg, diphenethyl Mg, and ethylphenethyl Mg.

The organic Mg may be a mixture or complex compound with an organic compound of other metal. The organic compound of other metal is represented by the general formula MRn (wherein M denotes boron, beryllium, aluminum, or zinc, R denotes an alkyl, cycloalkyl, aryl, or aralkyl group of 1 to 20 carbon atoms, and n denotes the valency of the metal M). Concrete examples of the organic compound of other metals are triethyl aluminum, tributyl aluminum, triisobutyl aluminum, triphenyl aluminum, triethyl boron, tributyl boron, diethyl beryllium, diisobutyl beryllium, diethyl zinc, and dibutyl zinc.

In the aforementioned mixture or complex compound, the ratio of the organic Mg to the organic compound of other metal generally is such that the amount of the other metal is not more than 5 gram atoms, preferably not more than 2 gram atoms, per gram atom of magnesium.

(C) Halogen-containing Alcohol

The term "halogen-containing alcohol" as used in this invention means a monohydric or polyhydric alcohol possessing one or more hydroxyl groups in the molecule thereof and having one or more hydrogen atoms thereof other than the aforementioned hydroxyl group substituted with a halogen atom. Concrete examples of the halogen atom are chlorine, bromine, iodine, and fluorine atom. Among the halogen atoms cited above, the chlorine atom is particularly desirable.

Examples of the halogen-containing alcohol are 2-chloroethanol, 1-chloro-2-propanol, 3-chloro-1-propanol, 1-chloro-2-methyl-2-propanol, 4-chloro-1-butanol, 5-chloro-1-pentanol, 6-chloro-1-hexanol, 3-chloro-1,2-propane diol, 2-chlorocyclohexanol, 4-chlorobenzhydrol, (m,o,p)-chlorobenzyl alcohol, 4-chlorocatechol, 4-chloro(m,o)-cresol, 6-chloro-(m,o)-cresol, 4-chloro-3,5-dimethylphenol, chlorohydroquinone, 2-benzyl-4-chlorophenol, 4-chloro-1-naphthol, (m,o,p)-chlorophenol, p-chloro-alpha-methylbenzyl alcohol, 2-chloro-4-phenylphenol, 6-chlorothimol, 4-chlororesorcin, 2-bromoethanol, 3-bromo-1-propanol, 1-bromo-2-propanol, 1-bromo-2-butanol, 2-bromo-p-cresol, 1-bromo-2-naphthol, 6-bromo-2-naphthol, (m,o,p)-bromophenol, 4-bromoresorcin, (m,o,p)-fluorophenol, p-iodophenol: 2,2-dichloroethanol, 2,3-dichloro-1-propanol, 1,3-dichloro-2-propanol, 3-chloro-1-(alpha-chloromethyl)-1-propanol, 2,3-dibromo-1-propanol, 1,3-dibromomono-2-propanol, 2,4-dibromophenol, 2,4-dibromo-1-naphthol: 2,2,2-trichloroethanol, 1,1,1-trichloro-2-propanol, β,β,β-trichlorotert-butanol, 2,3,4-trichlorophenol, 2,4,5-trichlorophenol, 2,4,6-trichlorophenol, 2,4,6-tribromophenol, 2,3,5-tribromo-2-hydroxy toluene, 2,3,5-tribromo-4-hydroxy toluene, 2,2,2-trifluoroethanol, alpha,alpha,alpha-trifluoro-m-cresol, 2,4,6-triiodophenol: 2,3,4,6-tetrachlorophenol, tetrachlorohydroquinone, tetrachloro-bis-phenol A, tetrabromo-bis-phenol A, 2,2,3,3-tetrafluoro-1-propanol, 2,3,5,6-tetrafluorophenol, and tetrafluororesorcin.

(D) Electron-donating Compound

Examples of the electron-donating compound are carboxylic acids, carboxylic anhydrides, carboxylic esters, carboxylic halides, alcohols, ethers, ketones, amines, amides, nitriles, aldehydes, alcoholates, phosphorus, bismuth, and antimony compounds linked with organic groups through the medium of carbon or oxygen atom, phosphamides, thioethers, thioesters, and carbonic esters. Among other electron-donating compounds cited above, carboxylic acids, carboxylic anhydrides, carboxylic esters, carboxylic halides, alcohols and ethers are particularly desirable.

Concrete examples of the carboxylic acids are aliphatic monocarboxylic acids such as formic acid, acetic acid, propionic acid, butyric acid, isobutyric acid, valeric acid, caproic acid, pivalic acid, acrylic acid, methacrylic acid, and crotonic acid, aliphatic dicarboxylic acids such as malonic acid, succinic acid, glutaric acid, adipic acid, sebacic acid, maleic acid, and fumaric acid, aliphatic oxycarboxylic acids such as tartaric acid, alicyclic carboxylic acids such as cyclohexane monocarboxylic acids, cyclohexene monocarboxylic acids, cis-1,2-cyclohexane dicarboxylic acids, and cis-4-methylcyclohexane-1,2-dicarboxylic acids, aromatic monocarboxylic acids such as benzoic acid, toluic acid, anisic acid, p-tert-butyl-benzoic acid, naphtholic acid, and cinnamic acid, and aromatic poly carboxylic acids such as phthalic acid, isophthalic acid, terephthalic acid, naphthalic acid, trimellitic acid, hemimellitic acid, trimestic acid, pyromellitic acid, and mellitic acid.

Concrete examples of carboxylic anhydrides are the anhydrides of the carboxylic acids enumerated above.

Carboxylic esters are monoesters and polyesters of the carboxylic acids enumerated above. Concrete examples of such monoesters and polyesters are butyl formate, ethyl acetate, butyl acetate, isobutyl isobutyrate, propyl pivalate, isobutyl pivalate, ethyl acrylate, methyl methacrylate, ethyl methacrylate, isobutyl methacrylate, diethyl malonate, diisobutyl malonate, diethyl succinate, dibutyl succinate, diisobutyl succinate, diethyl glutarate, dibutyl glutarate, diisobutyl glutarate, diisobutyl adipate, dibutyl sebacate, diisobutyl sebacate, diethyl maleate, dibutyl maleate, diisobutyl maleate, monomethyl fumarate, diethyl fumarate, diisobutyl fumarate, diethyl tartrate, dibutyl tartrate, diisobutyl tartrate, ethyl cyclohexanecarboxylates, methyl benzoate, ethyl benzoate, methyl p-toluate, ethyl p-tert butyl-benzoate, ethyl p-anisate, ethyl alpha-naphthoate, isobutyl alpha-naphthoate, ethyl cinnamate, monomethyl phthalate, monobutyl phthalate, dibutyl phthalate, diisobutyl phthalate, dihexyl phthalate, dioctyl phthalate, di-2-ethylhexyl phthalate, diallyl phthalate, diphenyl phthalate, diethyl isophthalate, diisobutyl isophthalate, diethyl terephthalate, dibutyl terephthalate, diethyl paphthalate, dibutyl naphthalate, triethyl trimellate, tributyl trimellate, tetramethyl pyromellate, tetraethyl pyromellate, and tetrabutyl pyromellate.

Carboxylic halides are halides of the carboxylic acids enumerated above. Concrete examples of such halides are acetic acid chloride, acetic acid bromide, acetic acid iodide, propionic acid chloride, butyric acid chloride, butyric acid bromide, butyric acid iodide, pivalic acid chloride, pivalic acid bromide, acrylic acid chloride, acrylic acid bromide, acrylic acid iodide, methacrylic acid chloride, methacrylic acid bromide, methacrylic acid iodide, crotonic acid chloride, maloic acid chloride, maloic acid bromide, succinic acid chloride, succinic acid bromide, glutaric acid chloride, glutaric acid bromide, adipic acid chloride, adipic acid bromide, sebacic acid chloride, sebacic acid bromide, maleic acid chloride, maleic acid bromide, fumaric acid chloride, fumaric acid bromide, tartaric acid chloride, tartaric acid bromide, cyclohexane-carboxylic acid chloride, cyclohexane-carboxylic acid bromides, 1-cyclohexene-carboxylic acid chloride, cis-4-methylcyclohexene-carboxylic acid chloride, cis-4-methylcyclohexene-carboxylic acid bromide, benzoyl chloride, benzoyl bromide, p-toluic acid chloride, p-toluic acid bromide, p-anisic acid chloride, p-anisic acid bromide, alpha-naphthoic acid chloride, cinnamic acid chloride, cinnamic acid bromide, phthalic acid dichloride, phthalic acid dibromide, isophthalic acid dichloride, isophthalic acid dibromide, terephthalic acid dichloride, and naphthalic acid dichloride. Further monoalkylhalides of dicarboxylic acids such as adipic acid monomethyl chloride, maleic acid monoethyl chloride and maleic acid monomethyl chloride and phthalic acid butyl chloride are also usable.

Alcohols are represented by the general formula ROH. In the formula, R denotes an alkyl, alkenyl, cycloalkyl, aryl, or aralkyl group of 1 to 12 carbon atoms. Concrete examples of such alcohols are methanol, ethanol, propanol, isopropanol, butanol, isobutanol, pentanol, hexanol, octanol, 2-ethylhexanol, cyclohexanol, benzyl alcohol, allyl alcohol, phenol, cresol, xylenol, ethyl phenol, isopropyl phenol, p-tertiary butyl phenol, and n-octyl phenol. Ethers are represented by the general formula ROR'. In the formula, R and R' each denote an alkyl, alkenyl, cycloalkyl, aryl, or aralkyl group of 1 to 12 carbon atoms, providing that R and R' may be equal to or different from each other. Concrete examples of such ethers are diethyl ether, diisopropyl ether, dibutyl ether, diisobutyl ether, diisoamyl ether, di-2-ethylhexyl ether, diallyl ether, ethylallyl ether, butylallyl ether, diphenyl ether, anisol, and ethylphenyl ether. Any of the compounds cited above as examples of halogen-containing alcohols is also usable.

(E) Titanium Compound

Titanium compounds are divalent, trivalent, and tetravalent titanium compounds. Concrete examples of such titanium compounds are titanium tetrachloride, titanium tetrabromide, trichlorethoxy titanium, trichlorobutoxy titanium, dichlorodiethoxy titanium, dichlorodibutoxy titanium, dichlorodiphenoxy titanium, chlorotriethoxy titanium, chlorotributoxy titanium, tetrabutoxy titanium, and titanium trichloride. Among other titanium compounds enumerated above, such tetravalent titanium halides such as titanium tetrachloride, trichloroethoxy titanium, dichlorodibutoxy titanium, and dichlorodiphenoxy titanium prove desirable and titanium tetrachloride proves particularly desirable.

Method for Preparation of Catalyst Component

The catalyst component of the present invention is obtained by contacting a reaction product comprising (a) a metal oxide (hereinafter referred to as "A component"), the organic Mg (hereinafter referred to as "B component"), and the halogen-containing alcohol (hereinafter referred to as "C component") (b) with an electron-donating compound (hereinafter referred to as "D component") and a titanium compound (hereinafter referred to as "E component").

Contact of A Component, B Component, and C Component

The contact of A component, B component and C component is effected by (1) a procedure of first establishing contact between A component and B component and then introducing C component into contact therewith, (2) a procedure of first establishing contact between A component and C component and then introducing B component into contact thereof, (3) a procedure of first establishing contact between B component and C component and then introducing A component into contact therewith, or (4) a procedure of establishing contact among A component, B component and C component all at once.

The contact mentioned above, for example, is effected by stirring the relevant components in the presence or absence of an inactive medium or by mechanically comminuting the relevant components jointly.

Examples of the inactive medium usable in the contact are hydrocarbons such as pentane, hexane, heptane, octane, decane, cyclohexane, benzene, toluene, and xylene and halides of hydrocarbons such as 1,2-dichloroethane, 1,2-dichloropropane, carbon tetrachloride, butyl chloride, isoamyl chloride, bromobenzene, and chlorotoluene.

The contact of A component, B component and C component is generally carried out at a temperature of $-20°$ C. to $+150°$ C. for a period of 0.1 to 100 hours. Where the contact entails evolution of heat, there may be adopted a procedure of first mixing the components gradually at a low temperature and, after all the components have been wholly mixed, elevating the temperature and continuing the contact. Further during the course of the contact of the components, the individual components may be washed with the aforementioned inactive medium. The proportions in which A component, B component, and C component are used in the contact are such that the mol ratio B/A falls in the range of 0.01 to 10, that of C/A in the range of 0.01 to 10, and that of C/B in the range of 0.1 to 20.

The solid product obtained by the contact of A component, B component and C component (hereinafter referred to as "reaction product I") is subjected to the subsequent contact. Optionally, the reaction product I may be cleaned with a suitable cleaning agent such as, for example, the aforementioned inactive medium.

Contact with D Component and E Component

The contact of the reaction product I with an electron-donating (D component) and a titanium compound (E component) is effected by (1) a procedure of first establishing contact between the reaction product I and D component and then introducing E component into contact therewith, (2) a procedure of first establishing contact between the reaction product I and E component and then introducing D component into contact therewith, or (3) a procedure of establishing contact between D component and E component used jointly on one part and the reaction product I on the other part.

The contact mentioned above is accomplished by mechanically comminuting the relevant components jointly or stirring them in the presence or absence of an inactive medium. It is more desirably effected by stirring the relevant components in the presence or absence of an inactive medium. As the inactive medium, any of the aforementioned compounds can be used effectively.

When the contact of the reaction product I with D component and C component is effected by their mechanical joint comminution, it is effected generally at a temperature in the range of 0° C. to 200° C. for a period of 0.1 to 100 hours. When the contact is carried out by stirring, it is effected generally at a temperature of 0° C. to 200° C. for a period of 0.5 to 20 hours. The amount of D component used in this contact is in the range of 0.005 to 10 gram mols, preferably 0.01 to 1 gram mol, per gram atom of magnesium in the reaction product I. The amount of E component used in the contact is above the level of 0.1 gram mol, preferably in the range of 1 to 50 gram mols, per gram atom of magnesium in the reaction product I.

The contact between the reaction product I and E component may be carried out twice or more. This contact can be effected by any of the procedures mentioned above. In this case, the product from the former contact may be cleaned with an inactive medium and the cleaned product allowed to contact with a freshly added portion of E component (in conjunction with the aforementioned medium).

Where the contact with E component is carried out in two or more split steps, the reaction mixture under treatment may be allowed to contact with an inactive hydrocarbon, halide of hydrocarbon, or metal halide compound between the split steps of contact.

Examples of the inactive hydrocarbon usable for the contact are aliphatic, alicyclic, and aromatic hydrocarbons. Concrete examples of such hydrocarbons are n-hexane, methyl hexane, dimethyl hexane, ethyl hexane, ethylmethyl pentane, n-heptane, methyl heptane, trimethyl pentane, dimethyl heptane, ethyl heptane, trimethyl hexane, trimethyl heptane, n-octane, methyl octane, dimethyl octane, n-undecane, n-dodecane, n-tridecane, n-tetradecane, n-pentadecane, n-hexadecane, n-octadecane, n-nonadecane, n-eicosane, cyclopentane, cyclohexane, methyl cyclopentane, cycloheptane, dimethyl cyclopentane, methyl cyclohexane, ethyl cyclopentane, dimethyl cyclohexane, ethyl cyclohexane, cyclooctane, indane, n-butyl cyclohexane, isobutyl cyclohexane, adamantane, benzene, toluene, xylene, ethylbenzene, tetramethylbenzne, n-butylbenzene, isobutylbenzene, propyl toluene, decalin, and tetralin.

Examples of the halide of hydrocarbon usable for the contact are mono- and poly-halogen substitution products of saturated or unsaturated aliphatic, alicyclic, and aromatic hydrocarbons. Concrete examples of such compounds are aliphatic compounds such as methyl chloride, methyl bromide, methyl iodide, methylene chloride, methylene bromide, methylene iodide, chloroform, bromoform, iodoform, carbon tetrachloride, carbon tetrabromide, carbon tetraiodide, ethyl chloride, ethyl bromide, ethyl iodide, 1,2-dichloroethane, 1,2-dibromo-ethane, 1,2-diiodo-ethane, methyl chloroform, methyl bromoform, methyl iodoform, 1,1,2-trichloroethylene, 1,1,2-tribromoethylene, 1,1,2,2-tetrachloroethylene, pentachloro-ethane, hexachloro-ethane, hexabromo-ethane, n-propyl chloride, 1,2-dichloropropane, hexachloro-propylene, octachloro-propane, decabromobutane, and chlorinated paraffins, alicyclic compounds such as chlorocyclopropane, tetrachlorocyclopentane, hexachloropentane, and hexachlorocyclohexane, and aromatic compounds such as chlorobenzene, bromobenzene, o-dichlorobenzene, p-dichlorobenzene, hexachlorobenzene, hexabromobenzene, benzotrichloride, and p-chlorobenzo-trichloride.

These compounds are such that one member of a mixture of two or more members selected from the compounds enumerated above may be advantageously used.

The metal halide compound is the halide of one element selected from the class of elements of Group IIIa, Group IVa, and Group Va in the Periodic Table of Elements (hereinafter referred to as "metal halide"). Examples of the metal halide are chlorides, fluorides, bromides, and iodides of B, Al, Ga, In, Tl, Si, Ge, Sn, Pb, As, Sb, and Bi. Among other metal halides enumerated above, $BCl_3$, $BBr_3$, $BI_3$, $AlCl_3$, $AlBr_3$, $AlI_3$, $GaCl_3$, $GaBr_3$, $InCl_3$, $TlCl_3$, $SiCl_4$, $SnCl_4$, $SbCl_5$, and $SbF_5$ prove particularly desirable.

The contact of the reaction mixture optionally made with the inactive hydrocarbon, halide of hydrocarbon, or metal halide (hereinafter referred to as "F component") between the two or more split steps of contact made by the E component is carried out at a temperature in the range of 0° to 200° C. for a period of 5 minutes to 20 hours, preferably at 20° C. to 150° C. for 10 minutes to 5 hours. When the F component is a liquid substance, it is desired to be used in such an amount that the reaction product I is obtained in an amount in the range of 1 to 1,000 g per liter of the F component. When the F component is a solid substance, this solid F component is desired to be used as dissolved in another F component capable of dissolving the solid F component. The amount of this solid F component is desired to be such that the reaction product I is obtained in an amount in the range of 0.01 to 100 g per g of the F component.

The mass of contact between the reaction product I with the component E may be allowed to contact with the F component. This contact can be carried out in the same manner as in the contact optionally made by the use of the aforementioned F component.

The contact reaction product obtained as described above is cleaned, when necessary, with hydrocarbon such as hexane, heptane, octane, cyclohexane, benzene, toluene, or xylene, and then dried to give birth to the catalyst component of the present invention.

The catalyst component of the present invention is formed of particles having a specific surface area in the range of 10 to 1,000 $m^2/g$ and a pore volume in the range of 0.05 to 5 $cm^3/g$ as measured by the BET method at the adsorption temperature of liquefied nitrogen and possessing diameters so uniform as to be distributed in a narrow range. As to percentage composition, this catalyst component comprises 3 to 90% by weight of metal oxide, 1 to 25% by weight of magnesium, 0.5 to 10% by weight of titanium, and 4 to 60% by weight of chlorine.

Catalyst for the Polymerization of Olefins

The catalyst component of the present invention is used, as combined with an organic compound of a metal selected from the class of metals belonging to Groups I through III in the Periodic Table of Elements, for catalyzing the homopolymerization of an olefin or the copolymerization of the olefin with other olefins.

Organic Compound of Metal of Group I through Group III

Examples of the organic metal compounds usable in combination with the catalyst component are organic compounds of lithium, magnesium, calcium, zinc, and aluminum. Among other organic metal compounds just mentioned, organic aluminum compounds prove particularly desirable. The organic aluminum compounds usable herein are represented by the general formula $R_nAlX_{3-n}$ (wherein R denotes an alkyl group or an aryl group, X denotes a halogen atom, an alkoxy group or a hydrogen atom, and n denotes a desired number in the range of $1 \leq n \leq 3$). Particularly desirable examples of the organic aluminum compounds are alkyl aluminum compounds such as trialkyl aluminum, dialkyl aluminum monohalide, monoalkyl aluminum dihalide, alkyl aluminum sesquihalide, dialkyl aluminum monoalkoxide, and dialkyl aluminum monohydride, respectively having 1 to 18 carbon atoms, preferably 2 to 6 carbon atoms, and mixtures and complex compounds thereof. Concrete examples of such organic aluminum compounds are trialkyl aluminums such as trimethyl aluminum, triethyl aluminum, tripropyl aluminum, triisobutyl aluminum, and trihexyl aluminum, dialkyl aluminum monohalides such as dimethyl aluminum chloride, diethyl aluminum chloride, diethyl aluminum bromide, diethyl aluminum iodide, and diisobutyl aluminum chloride, monoalkyl aluminum dihalides such as methyl aluminum dichloride, ethyl aluminum dichloride, methyl aluminum dibromide, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide, and dialkyl aluminum hydrides such as dimethyl aluminum hydride, diethyl aluminum hydride, dipropyl aluminum hydride, and diisobutyl aluminum hydride. Among other organic aluminum compounds enumerated above, trialkyl aluminums, specifically triethyl aluminum, triisobutyl aluminum, prove particularly desirable. The trialkyl aluminum can be used in combination with other organic aluminum compounds such as diethyl aluminum chloride, ethyl aluminum dichloride, ethyl aluminum sesquichloride, diethyl aluminum ethoxide, or diethyl aluminum hydride which is easily available commercially. These other organic aluminum compounds may be used in the form of a mixture or complex compound.

Further, an organic aluminum compound having two or more aluminum atoms linked through the medium of an oxygen atom or nitrogen atom is also usable. Concrete examples of this organic aluminum compound are $(C_2H_5)_2AlOAl(C_2H_5)_2$, $(C_4H_9)_2AlOAl(C_4H_9)_2$, and

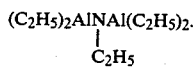

Examples of organic compounds of metals other than aluminum are diethyl magnesium, ethyl magnesium chloride, diethyl zinc and such compounds as $LiAl(C_2H_5)_4$ and $LiAl(C_7H_{15})_4$.

The organic metal compound may be used independently or in combination with an electron-donating compound. This electrondonating compound may be any of the electron-donating compounds employed in the preparation of the catalyst component described above. Besides, organic silicon compounds capable of serving as electron-donating compounds and electron-donating compounds containing hetero atoms such as nitrogen, sulfur, oxygen, and phosphorus atoms are also usable.

Concrete examples of organic silicon compounds are tetramethoxy silane, tetraethoxy silane, tetrabutoxy silane, tetraisobutoxy silane, tetraphenoxy silane, tetra(p-methylphenoxy) silane, tetrabenzyloxy silane, methyl trimethoxy silane, methyl triethoxy silane, methyl tributoxy silane, methyl triphenoxy silane, ethyl triethoxy silane, ethyl triisobutoxy silane, ethyl triphenoxy silane, butyl trimethoxy silane, butyl triethoxy silane, butyl triphenoxy silane, isobutyl triisobutoxy silane, vinyl triethoxy silane, allyl trimethoxy silane, phenyl trimethoxy silane, phenyl triethoxy silane, benzyl triphenoxy silane, methyl triallyloxy silane, dimethyl dimethoxy silane, dimethyl diethoxy silane, dimethyl diisopropoxy silane, dimethyl dibutoxy silane, dimethyl dihexyloxy silane, dimethyl diphenoxy silane, diethyl diethoxy silane, diethyl diisobutoxy silane, diethyl diphenoxy silane, dibutyl diisopropoxy silane, dibutyl dibutoxy silane, dibutyl diphenoxy silane, diisobutyl diethoxy silane, diisobutyl diisobutoxy silane, diphenyl dimethoxy silane, diphenyl diethoxy silane, diphenyl dibutoxy silane, dibenzyl diethoxy silane, divinyl diphenoxy silane, diallyl dipropoxy silane, diphenyl diallyloxy silane, methylphenyl dimethoxy silane, and chlorophenyl diethoxy silane.

Concrete examples of the electron-donating compound containing a hetero atom are such nitrogen atom-containing compounds as 2,2,6,6-tetramethyl piperidine, 2,6-dimethyl piperidine, 2,6-diethyl piperidine, 2,6-diisopropyl piperidine, 2,2,5,5-tetramethyl pyrrolidine, 2,5-dimethyl pyrrolidine, 2,5-diethyl pyrrolidine, 2,5-diisopropyl pyrrolidine, 2-methyl pyridine, 3-methyl pyridine, 4-methyl pyridine, 1,2,4-trimethyl piperidine, 2,5-dimethyl piperidine, methyl nicotinate, ethyl nicotinate, nicotinic acid amide, benzoic acid amide, 2-methyl pyrrole, 2,5-dimethyl pyrrole, imidazole, toluic acid amide, benzonitrile, acetonitrile, aniline, paratoluidine, ortho-toluidine, meta-toluidine, triethyl amine, diethyl amine, dibutyl amine, tetramethylene diamine, and tributyl amine, such sulfur atom-containing compounds as thiophenol, thiophene, ethyl 2-thiophene carboxylate, ethyl 3-thiophene carboxylate, 2-methyl thiophene, methyl mercaptan, ethyl mercaptan, isopropyl mercaptan, butyl mercaptan, diethyl thioether, methyl benzenesulfonate, methyl sulfite, and ethyl sulfite, such oxygen atom-containing compounds as tetrahydrofuran, 2-methyl tetrahydrofuran, 3-methyl tetrahydrofuran, dioxane, dimethyl ether, diethyl ether, dibutyl ether, diisoamyl ether, diphenyl ether, anisole, acetophenone, acetone, methylethyl ketone, acetyl acetone, ethyl 2-furalate, isoamyl 2-furalate, methyl 2-furalate, and propyl 2-furalate, and such phosphorus atom-containing compounds as triphenyl phosphine, tributyl phosphine, triphenyl phosphite, tribenzyl phosphite, diethyl phosphate, and diphenyl phosphate.

These electron-donating compounds are such that two or more members selected from the group of compounds enumerated above can be used as a mixture. The electron-donating compound may be used at the same time that the organic metal compound is used in combination with the catalyst component or it may be used after it has been placed in contact with the organic metal compound.

The amount of the organic metal compound to be used relative to the catalyst component of the present invention falls generally in the range of 1 to 2000 gram mols, preferably 20 ti 500 gram mols, per gram atom of titanium present in the catalyst component.

The proportions of the organic metal compound and the electron-donating compound are such that the amount of the organic metal compound falls in the range of 0.1 to 40 gram atoms, preferably 1 to 25 gram atoms, per mol of the electron-donating compound.

Polymerization of Olefins

The catalyst which comprises the catalyst component obtained as described above and the organic metal compound (and the electron-donating compound) is useful for catalyzing homopolymerization of a monoolefin of 2 to 10 carbon atoms or copolymerization of the monoolefin in combination with other monoolefins or diolefins of 3 to 10 carbon atoms. The catalyst exhibits an outstanding function, particularly in catalyzing homopolymerization of an alpha-olefin such as, for example, propylene, 1-butene, 4-methyl-1-pentene, or 1-hexene, copolymerization of two such alpha-olefins and/or random and block copolymerization of the alpha-olefin with ethylene.

The polymerization may be carried out in either the gaseous phase or the liquid phase. When the polymerization is performed in the liquid phase, it can be effected on a liquid monomer in an inactive hydrocarbon such as normal butane, iso-butane, normal pentane, iso-pentane, hexane, heptane, octane, cyclohexane, benzene, toluene, or xylene. The polymerization temperature falls generally in the range of $-80°$ C. to $+150°$ C., preferably in the range of $40°$ C. to $120°$ C. The polymerization pressure is sufficient in the range of 1 to 60 atmospheres. Adjustment of the molecular weight of the polymer to be obtained is attained by causing the polymerization to proceed in the presence of hydrogen or other known molecular weight adjusting agents. The amount of the other olefin with which the olefin is copolymerized generally is not allowed to exceed 30% by weight and preferably is selected in the range of 0.3 to 15% by weight. The polymerization by the catalyst system of this invention can be carried out continuously or batchwise under those conditions which are generally adopted for the purpose of polymerization. The copolymerization may be performed in one step or in two or more split steps.

Effect of the Invention

The catalyst component of the present invention functions effectively as a catalyst for the production of a polyolefin, particularly isotactic polypropylene, a random copolymer of ethylene and propylene, and a block copolymer of ethylene and propylene.

The polymerization catalyst using the catalyst component of the present invention possesses high polymerization activity and high stereoregularity and permits the high polymerization activity to be retained long during the course of the polymerization. The olefin polymer powder consequently obtained has high bulk density. The polymer powder abounds with fluidity.

EXAMPLE

The present invention will be described more specifically below with reference to working examples and applied examples. The examples are for purposes of illustrating the invention and should not be interpreted as a limitation of the invention. The percents (%) mentioned in the working examples and the applied examples are percents by weight unless otherwise specified.

The heptane insolubles content (hereinafter referred to as "HI") which shows the proportion of crystalline polymer to the whole of a given polymer represents the residue after 6 hours extraction of the polymer with boiling n-heptane in an improved version of Soxhlet extracter. The melt flow rate (MFR) represents the value determined in accordance with ASTM D-1238. The bulk density represents the value determined by the method A defined in ASTM D-1895-69.

EXAMPLE 1

Contact of Silicon Oxide with n-Butylethyl Magnesium

A flask having an inner volume of 200 ml and provided with a dropping funnel and a stirrer has its interior air displaced with nitrogen gas. In the flask, 5 g of silicon oxide (product of Davison Corp. having a specific surface area of 302 $m^2/g$, a pore volume of 1.54 $cm^3/g$, and an average pore radius of 204Å and marketed under the trademark designation of G-952)(hereinafter referred to as "$SiO_2$") fired under a flow of nitrogen gas at 200° C. for two hours and further at 700° C. for five hours and 20 ml of n-heptane were placed. The compounds so placed and 20 ml of a 20% n-heptane solution of n-butylethyl magnesium (hereinafter referred to as "BEM") (the solution in the amount of 26.8 mmol as BEM) added thereto were stirred at 90° C. for two hours. The supernatant consequently formed was removed by decantation and the solid was washed with 50 ml of n-heptane at room temperature and the supernatant formed again was removed by decantation. The washing treatment with n-heptane was repreated four more times.

Contact with 2,2,2-trichloethanol

The solid product issuing from the last washing treatment was suspended in 20 ml of n-heptane. Into the resultant suspension, a solution of 9.6 g (64 mmols) of 2,2,2-trichloroethanol in 10 ml of n-heptane was added dropwise through the dropping funnel at 0° C. over a period of 30 minutes. The suspension and the added solution were stirred at 0° C. for one hour, heated to 80° C. over a period of one hour and again stirred at 80° C. for one hour. After the completion of the reaction, the reaction mixture at room temperature was washed twice with 50 ml of n-heptane and three times with 50 ml of toluene. The solid consequently obtained (solid component I), by analysis, was found to contain 49.5% of $SiO_2$, 3.8% of magnesium, and 33.5% of chlorine. This solid was found to have a specific surface area of 255 $m^2/g$ and a pore volume of 0.79 $cm^2/g$.

Contact with d-n-butyl phthalate and titanium tetrachloride

The solid component I obtained in the preceding procedure and 20 ml of toluene and 0.6 g of di-n-butyl phthalate added thereto were heated for reaction at 50° C. for two hours. Then, the reaction mixture and 30 ml of titanium tetrachloride added thereto were heated for reaction at 90° C. for two hours. The solid substance obtained by this reaction was washed at room temperature eight times with 50 ml of n-hexane. It was then dried under a vacuum at room temperature for one hour. Consequently, 7.5 g of a catalyst component was obtained. This catalyst component was found to have a specific surface area of 285 $m^2/g$ and a pore volume of 0.87 $cm^3/g$. This catalyst component was found to contain 55.9% of SiO$_2$, 4.3% of magnesium, 16.3% of chlorine, and 3.1% of titanium.

EXAMPLE 2

The solid substance formed after contact with titanium tetrachloride in the procedure of Example 1 was separated. This solid substance and 30 ml of titanium tetrachloride added thereto were heated for reaction at 90° C. for two hours. The solid substance consequently formed was treated in the same way as in Example 1, to afford a catalyst component having a titanium content of 2.8%.

EXAMPLE 3

The reaction mixture formed after contact with titanium tetrachloride in the procedure of Example 1 was decanted to expel the supernatant. The solid substance which remained was cleaned in 50 ml of toluene at 90° C. for 15 minutes. The washing treatment with toluene was repeated. The washed solid substance and 20 ml of toluene and 30 ml of titanium tetrachloride added thereto were heated for reaction at 90° C. for two hours. The resultant reaction mixture was washed with n-hexane and dried in the same way as in Example 1, to afford 7.4 g of a catalyst component. This catalyst component was found to have a specific surface area of 279 m$^2$/g and a pore volume of 0.90 m$^3$/g. It was found to contain 56.5% of SiO$_2$, 4.4 g of magnesium, 15.1% of chloride, and 2.4% of titanium.

EXAMPLE 4

The procedure of Example 3 was repeated, except that the temperature of contact with titanium tetrachloride was changed from 90° C. to 120° C. Consequently, there was prepared a catalyst component having a titanium content of 2.1%.

EXAMPLE 5

The procedure of Example 3 was repeated, except that in the contact of di-n-butyl phthalate and titanium tetrachloride, these two compounds were added at the same time for reaction. Consequently, there was prepared a catalyst component having a titanium content of 2.5%.

EXAMPLE 6

The procedure of Example 3 was repeated, except that in the contact of di-n-butyl phthalate and titanium tetrachloride, 30 ml of titanium chloride was added and abruptly heated to 90° C. while under stirring, 0.6 g of di-n-butyl phthalate was added subsequently and heated for reaction at 90° C. for two hours. Consequently, there was prepared a catalyst component having a titanium content of 2.4%.

EXAMPLE 7

The solid component I obtained in the procedure of Example 1 and 50 ml of titanium tetrachloride added thereto were stirred and heated suddenly to 90° C. The resultant mixture and 0.6 g of di-n-butyl phthalate added thereto were heated for reaction at 90° C. for two hours. After completion of the reaction, the supernatant was removed and the residue and 50 ml of titanium tetrachloride added thereto were heated for reaction at 90° C. for two hours. The resultant reaction mixture was washed and dried by following the procedure of Example 1, to afford a catalyst component having a titanium content of 3.3%.

EXAMPLE 8

In the procedure of Example 7, between the two split steps of contact with titanium tetrachloride, the reaction mixture was washed twice with 50 ml of titanium tetrachloride at 90° C. for 15 minutes. The reaction mixture was washed and dried by following the procedure of Example 1. Consequently, there was prepared a catalyst component having a titanium content of 3.0%.

EXAMPLES 9-11

The procedure of Example 3 was followed, except that in the contact of di-n-butyl phthalate and titanium tetrachloride, xylene (Example 9), n-heptane (Example 10), and 1,2-dichloroethane (Example 11) were severally used as an inactive medium in the place of toluene. Consequently, there were prepared catalyst components having titanium contents of 2.2% (Example 9), 3.5% (Example 10), and 2.8% (Example 11).

EXAMPLES 12-14

During the course of contact with di-n-butyl phthalate and titanium tetrachloride in the procedure of Example 3, the reaction mixture resulting from the first step of contact with titanium tetrachloride was freed of the supernatant. The residue and 50 ml of toluene and 3 g of silicon tetrachloride (Example 12), 3 g of aluminum trichloride (Example 13), or 3 g of hexachloroethane (Example 14) added thereto were heated for reaction at 60° C. for one hour. The resultant reaction mixture was washed four times with 50 ml of toluene at 60° C. The washed reaction mixture was mixed with 20 ml of toluene and 30 ml of titanium tetrachloride to undergo the second reaction with titanium tetrachloride. The reaction mixture consequently obtained was washed and dried in the same way as in Example 1. Consequently, there were produced catalyst components having titanium contents of 2.1% (Example 12), 2.7% (Example 13), and 2.3% (Example 14) respectively.

EXAMPLES 15 and 16

A solid substance was obtained by effecting the reaction of the solid substance I with titanium tetrachloride and di-n-butyl phthalate in the same way as in Example 3. This solid substance was washed eight times with n-hexane similarly to Example 1. The washed solid substance was converted by addition of n-hexane into a slurry (4.5 g of solid substance and 6.8 g of n-hexane). The slurry was held in contact with 1.1 g of hexachloroethane and 100 ml of n-hexane (Example 15), 100 ml 1,2-dichloro-ethane (Example 16) at 50° C. for 30 minutes. The solid substance consequently obtained was separated by filtration at 50° C., washed with 100 ml of n-hexane at room temperature, dried under a vacuum for one hour. Consequently, there were prepared catalyst components having titanium contents of 1.6% (Example 15) and 1.4% (Example 16) respectively.

EXAMPLES 17-20

Catalyst components having titanium contents shown below in Table I were prepared by following the procedure of Example 3, except that varying metal oxides indicated below were used in the place of SiO$_2$.

TABLE I

| Example | Metal Oxide | Firing Conditions | Titanium Content (%) |
|---|---|---|---|
| 17 | Al$_2$O$_3$ | 200° C./2 hours | 3.5 |

TABLE I-continued

| Example | Metal Oxide | Firing Conditions | Titanium Content (%) |
|---|---|---|---|
| 18 | (MgO)$_2$(SiO$_2$)$_3$ | 700° C./5 hours 200° C./2 hours | 2.5 |
| 19 | Mixture of 1 kg of SiO$_2$ and 100 g of Al$_2$O$_3$ | 500° C./5 hours 200° C./2 hours 700° C./5 hours | 2.3 |
| 20 | Mixture of 1 kg of SiO$_2$ and 20 g of CrO$_3$ | 200° C./2 hours 700° C./5 hours | 1.9 |

EXAMPLES 21–23

Catalyst components having titanium contents indicated below were prepared by following the procedure of Example 3, except that varying magnesium compounds indicated below in Table II were used in the place of BEM.

TABLE II

| Example | Organic Mg | Titanium Content (%) |
|---|---|---|
| 21 | Di-n-hexyl magnesium (product of Texas Alkyls Corp., marketed under trademark designation of MAGALA ® DNHM) | 2.5 |
| 22 | Di-n-butyl magnesium (0.5 mol)-triethyl aluminum (1 mol) complex (product of Texas Alkyls Corp., marketed under trademark designation of MAGALA ® 0.5E) | 2.4 |
| 23 | Di-n-butyl magnesium (7.5 mols)-triethyl aluminum (1 mol) complex product of Texas Alkyls Corp., marketed under trademark designation MAGALA ® 7.5E) | 2.5 |

EXAMPLE 24–42

Catalyst components having titanium contents indicated below Table III were prepared by following the procedure of Example 3, cept that varying hologen-containing alcohols indicated below in ble III were used in the place of 2,2,2-trichloroethanol.

TABLE III

| Example | Halogen-Containing Alcohol | Titanium Content (%) |
|---|---|---|
| 24 | 1,1,1-Trichloro-2-propanol | 2.3 |
| 25 | β,β,β-Trichloro-tert-butanol | 2.6 |
| 26 | 2,2-Dichloroethanol | 2.8 |
| 27 | 1,3-Dichloro-2-propanol | 2.7 |
| 28 | 2-Chloroethanol | 2.3 |
| 29 | 4-Chloro-1-butanol | 2.2 |
| 30 | 6-Chloro-1-hexanol | 2.6 |
| 31 | p-Chlorophenol | 2.9 |
| 32 | 4-Chloro-o-cresol | 2.7 |
| 33 | 2,4,6-Trichlorophenol | 2.4 |
| 34 | Tetrachlorohydroquinone | 2.2 |
| 35 | 1-Bromo-2-butanol | 2.6 |
| 36 | 1,3-Dibromo-2-propanol | 2.5 |
| 37 | p-Bromophenol | 2.3 |
| 38 | 2,4,6-Tribromophenol | 2.3 |
| 39 | p-Iodophenol | 2.7 |
| 40 | 2,4,6-Triiodophenol | 2.5 |
| 41 | 2,2,2-Trifluoroethanol | 2.9 |
| 42 | p-Fluorophenol | 2.2 |

EXAMPLES 43–67

Catalyst components having titanium contents shown below in Table IV were obtained by following the procedure of Example 3, except that varying electron-donating compounds indicated below in Table IV were used in the place of di-n-butyl phthalate during the contact with the solid component I.

TABLE IV

| Example | Electron-Donating Compound | Titanium Content (%) |
|---|---|---|
| 43 | Ethyl benzoate | 2.3 |
| 44 | Diisobutyl phthalate | 2.1 |
| 45 | Phthalic anhydride | 2.4 |
| 46 | Phthalic acid dichloride | 2.7 |
| 47 | Phthalic acid n-butyl chloride | 2.5 |
| 48 | Mono-n-butyl phthalate | 2.4 |
| 49 | Benzoic anhydride | 2.2 |
| 50 | Benzoyl chloride | 2.6 |
| 51 | Ethyl cinnamate | 2.4 |
| 52 | Ethyl cyclohexane carboxylate | 2.5 |
| 53 | Tartaric acid | 2.8 |
| 54 | Di-n-butyl tartrate | 2.4 |
| 55 | Isobutyl methacrylate | 2.3 |
| 56 | Phthalic acid | 2.1 |
| 57 | Benzoic acid | 3.0 |
| 58 | Di-n-butyl maleate | 3.2 |
| 59 | Diisobutyl sebacate | 2.8 |
| 60 | Tri-n-butyl trimellitate | 2.2 |
| 61 | Ethanol | 2.3 |
| 62 | Isobutanol | 2.0 |
| 63 | 2-Ethylhexanol | 2.3 |
| 64 | p-Cresol | 2.1 |
| 65 | Diethyl ether | 2.0 |
| 66 | Di-n-butyl ether | 2.2 |
| 67 | Diphenyl ether | 2.5 |

EXAMPLE 68

Contact of Silicon Oxide and 2,2,2-Trichloroethanol

A flask having an inner volume of 200 ml and provided with a dropping funnel and a stirrer had its interior air displaced with nitrogen gas. In this flask, 5 g of the same SiO$_2$ as used in Example 1, 40 ml of n-heptane, and 12 g of 2,2,2-trichloroethanol added thereto were stirred for contact at 90° C. for two hours. After completion of the reaction, the reaction mixture was washed three times with 50 ml of n-heptane and decanted at room temperature.

Contact with n-butylethyl magnesium

The solid substance obtained in the foregoing procedure was suspended in 20 ml of n-heptane. To the resultant suspension, 11 ml of the same BEM solution as used in Example 1 was added dropwise through the dropping funnel at 0° C. over a period of 30 minutes. The resultant mixture was stirred at 0° C. for one hour, heated to 80° C. over a period of one hour, and stirred at 80° C. for one hour. After completion of the reaction, the reaction mixture was washed twice with 50 ml of n-heptane and three times with 50 ml of toluene.

Contact with di-n-butyl phthalate and titanium tetrachloride

By following the procedure of Example 3, except that the solid component obtained in the preceding procedure was used instead in the contact with the di-n-butyl phthalate and titanium tetrachloride, there was obtained 7.8 g of a catalyst component having a titanium content of 2.5%.

EXAMPLE 69

Contact of Silicon Oxide and 2,2,2-Trichloroethanol

In a mill pot, 10 g of the same SiO$_2$ as used in Example 1 and 4.4 g of 2,2,2-trichloroethanol were subjected to a crushing treatment for 24 hours.

Contact with n-Butylethyl Magnesium

A flask having an inner volume of 200 ml and provided with a dropping funnel and a stirrer had its interior air displaced with nitrogen gas. In the flask, 6 g of the solid substance obtained in the preceding procedure and comminuted and 40 ml of n-heptane were placed. Then, 9 ml of the same BEM solution as used in Example 1 was added thereto dropwise through the dropping funnel at 0° C. over a period of 30 minutes. The resultant reaction mixture was thereafter treated in the same way as in Example 68 to obtain a solid component.

Contact with di-n-Butyl Phthalate and Titanium Tetrachloride

By following the procedure of Example 3, except that the solid component obtained in the preceding procedure was used instead in the contact with di-n-butyl phthalate and titanium tetrachloride, there was obtained 8.1 g of a catalyst component having a titanium content of 2.3%.

EXAMPLE 70

Contact of 2,2,2-trichloroethanol and n-butylethyl magnesium

A flask having an inner volume of 200 ml and provided with a dropping funnel and a stirrer had the interior air displaced with nitrogen gas. In the flask, 5 g of 2,2,2-trichloroethanol and 40 ml of n-heptanol were kept at 0° C. Then, 12.5 ml of the same BEM solution as used in Example 1 was added dropwise at 0° C. over a period of 30 minutes. The contents of the flask were stirred at 0° C. for one hour, then heated to 80° C. over a period of one hour, and then stirred at 80° C. for one hour. After completion of the reaction, the reaction mixture was washed three times with 50 ml of n-heptane at room temperature and then dried under a vacuum at room temperature for one hour. Consequently, there was obtained a solid reaction product.

Contact with silicon oxide

In a mill pot, 5 g of the solid reaction product obtained in the preceding procedure and 8 g of the same $SiO_2$ as used in Example 1 were subjected to a comminution treatment for 24 hours.

Contact with di-n-butyl phthalate and titanium tetrachloride

By following the procedure of Example 3, except that 6 g of the comminuted solid substance obtained in the preceding procedure was used instead in the contact with di-n-butyl pthalate and titanium tetrachloride, there was obtained 6.8 g of a catalyst component having a titanium content of 2.5%.

EXAMPLE 71

Contact of Silicon Oxide, n-Butylethyl Magnesium, and 2,2,2-Trichloroethanol A flask having an inner volume of 200 ml and provided with a dropping funnel and a stirrer had its interior air displaced with nitrogen gas. In the flask, 5 g of the same $SiO_2$ as used in Example 1 and 20 ml of n-heptane were placed. Then 30 ml of the same BEM solution as used in Example 1 was added and subsequently 12 g of 2,2,2-trichloroethanol was added dropwise thereto at 0° C. over a period of 30 minutes. The resultant mixture was stirred at 0° C. for one hour, heated to 80° C. over a period of one hour, and stirred at 80° C. for one hour. After completion of the reaction, the reaction mixture was washed twice with 50 ml of n-heptane and three times with 50 ml of toluene at room temperature, to obtain a solid component.

Contact with di-n-butyl phthalate and titanium tetrachloride

By following the procedure of Example 3, except that the solid component obtained in the preceding procedure was used instead in the contact of di-n-butyl phthalate and titanium tetrachloride, there was obtained 7.5 g of catalyst component having a titanium content of 2.6%.

APPLIED EXAMPLE 1

In a stainless steel autoclave having an inner volume of 1.5 liters and provided with a stirrer, a reaction mixture obtained by mixing 30.3 mg of the catalyst component prepared by the procedure of Example 1, 0.97 ml of a solution containing 1 mol of triethyl aluminum (hereinafter referred to as "TEAL") per liter of n-heptane, and 0.97 ml of a solution containing 0.1 mol of phenyl triethoxy silane (hereinafter referred to as "PES") per liter of n-heptane and allowing the resultant mixture to stand for five minutes was placed under a blanket of nitrogen gas. Then, 0.1 liter of hydrogen gas as a molecular weight regulator and 1 liter of liquefied propylene were introduced therein under pressure. The reaction system was heated to 70° C. to effect polymerization of propylene for one hour. After completion of the polymerization, the unaltered propylene was purged to produce 105 g of white polypropylene powder having 97.6% of HI, 4.7 of MFR, and 0.42 g/cm³ of bulk density [Kc (amount of produced polymer in g per g of catalyst component)=3,500 and Kt (amount of produced polymer in kg per g of titanium in catalyst component)=113].

APPLIED EXAMPLES 2-71

Polymerization of propylene was carried out by following the procedure of Applied Example 1, except that the catalyst components obtained in Examples 2-71 were severally used. The results are shown in Table VI. The polypropylene powder obtained in Applied Example 3 was tested for particle diameter distribution. The results are shown in Table V below.

TABLE V

| Particle diameter (μm) | Proportion of distribution (%) |
|---|---|
| Less than 149 | 0 |
| 149–250 | 0.1 |
| 250–350 | 2.3 |
| 350–420 | 5.9 |
| 420–590 | 24.9 |
| 590–840 | 42.3 |
| 840–1,000 | 12.8 |
| 1,000–1,680 | 11.6 |
| Exceeding 1,680 | 0.1 |

TABLE VI

| Applied Example | Catalyst Component | Kc (g/g Cat) | Kt (kg/g Ti) | HI (%) | MFR (g/10 min) | Bulk Density (g/cm³) |
|---|---|---|---|---|---|---|
| 2 | Example 2 | 3,200 | 114 | 97.5 | 4.5 | 0.42 |
| 3 | Example 3 | 4,300 | 179 | 98.1 | 4.7 | 0.44 |
| 4 | Example 4 | 3,900 | 186 | 98.0 | 5.1 | 0.43 |
| 5 | Example 5 | 3,900 | 156 | 97.9 | 4.0 | 0.43 |
| 6 | Example 6 | 4,300 | 179 | 98.4 | 3.9 | 0.45 |
| 7 | Example 7 | 3,100 | 94 | 97.7 | 5.5 | 0.43 |

TABLE VI-continued

| Applied Example | Catalyst Component | Kc (g/g Cat) | Kt (kg/g Ti) | HI (%) | MFR (g/10 min) | Bulk Density (g/cm³) |
|---|---|---|---|---|---|---|
| 8 | Example 8 | 3,600 | 120 | 98.0 | 5.0 | 0.44 |
| 9 | Example 9 | 4,000 | 182 | 98.0 | 4.2 | 0.43 |
| 10 | Example 10 | 3,600 | 103 | 97.9 | 6.2 | 0.40 |
| 11 | Example 11 | 3,700 | 132 | 97.5 | 5.8 | 0.42 |
| 12 | Example 12 | 3,600 | 171 | 97.8 | 4.9 | 0.41 |
| 13 | Example 13 | 3,900 | 144 | 98.2 | 6.0 | 0.43 |
| 14 | Example 14 | 3,700 | 161 | 98.0 | 4.9 | 0.42 |
| 15 | Example 15 | 3,200 | 200 | 98.2 | 5.4 | 0.44 |
| 16 | Example 16 | 3,400 | 243 | 98.3 | 5.9 | 0.45 |
| 17 | Example 17 | 3,100 | 89 | 97.8 | 4.5 | 0.43 |
| 18 | Example 18 | 2,800 | 112 | 97.3 | 4.8 | 0.41 |
| 19 | Example 19 | 2,600 | 113 | 97.2 | 5.3 | 0.40 |
| 20 | Example 20 | 2,900 | 153 | 97.6 | 5.8 | 0.41 |
| 21 | Example 21 | 3,900 | 156 | 97.8 | 4.3 | 0.44 |
| 22 | Example 22 | 3,600 | 150 | 97.6 | 6.2 | 0.42 |
| 23 | Example 23 | 3,500 | 140 | 97.5 | 5.8 | 0.43 |
| 24 | Example 24 | 3,900 | 170 | 97.9 | 4.3 | 0.44 |
| 25 | Example 25 | 4,100 | 158 | 98.0 | 4.9 | 0.43 |
| 26 | Example 26 | 3,600 | 129 | 97.7 | 5.6 | 0.43 |
| 27 | Example 27 | 2,900 | 107 | 97.5 | 5.3 | 0.43 |
| 28 | Example 28 | 3,200 | 139 | 97.6 | 6.1 | 0.43 |
| 29 | Example 29 | 3,200 | 145 | 97.4 | 5.6 | 0.42 |
| 30 | Example 30 | 2,900 | 112 | 97.3 | 6.7 | 0.43 |
| 31 | Example 31 | 3,600 | 124 | 97.7 | 5.4 | 0.43 |
| 32 | Example 32 | 3,300 | 122 | 97.8 | 4.8 | 0.41 |
| 33 | Example 33 | 3,700 | 154 | 97.6 | 6.2 | 0.42 |
| 34 | Example 34 | 2,700 | 123 | 97.6 | 6.3 | 0.43 |
| 35 | Example 35 | 2,500 | 96 | 97.4 | 7.1 | 0.42 |
| 36 | Example 36 | 2,800 | 112 | 97.2 | 5.8 | 0.41 |
| 37 | Example 37 | 3,100 | 135 | 97.1 | 6.6 | 0.43 |
| 38 | Example 38 | 2,900 | 126 | 97.3 | 5.5 | 0.43 |
| 39 | Example 39 | 2,600 | 96 | 97.0 | 4.6 | 0.42 |
| 40 | Example 40 | 2,500 | 100 | 97.4 | 7.2 | 0.41 |
| 41 | Example 41 | 3,100 | 107 | 97.3 | 6.8 | 0.43 |
| 42 | Example 42 | 2,600 | 118 | 97.3 | 6.3 | 0.42 |
| 43 | Example 43 | 3,000 | 130 | 97.9 | 3.8 | 0.43 |
| 44 | Example 44 | 3,800 | 181 | 98.2 | 4.0 | 0.43 |
| 45 | Example 45 | 3,200 | 133 | 98.0 | 4.6 | 0.40 |
| 46 | Example 46 | 3,500 | 130 | 98.1 | 4.2 | 0.40 |
| 47 | Example 47 | 3,100 | 124 | 98.0 | 4.0 | 0.42 |
| 48 | Example 48 | 3,300 | 138 | 97.9 | 5.1 | 0.41 |
| 49 | Example 49 | 2,900 | 132 | 97.9 | 5.8 | 0.40 |
| 50 | Example 50 | 2,900 | 112 | 97.8 | 4.0 | 0.40 |
| 51 | Example 51 | 2,700 | 113 | 97.6 | 4.6 | 0.38 |
| 52 | Example 52 | 2,900 | 116 | 97.8 | 4.7 | 0.39 |
| 53 | Example 53 | 2,800 | 100 | 97.5 | 6.1 | 0.40 |
| 54 | Example 54 | 2,900 | 121 | 97.6 | 4.0 | 0.40 |
| 55 | Example 55 | 3,100 | 135 | 97.6 | 6.8 | 0.41 |
| 56 | Example 56 | 3,000 | 143 | 97.8 | 4.2 | 0.40 |
| 57 | Example 57 | 3,000 | 100 | 97.5 | 4.0 | 0.40 |
| 58 | Example 58 | 2,900 | 91 | 97.6 | 5.8 | 0.41 |
| 59 | Example 59 | 3,000 | 107 | 97.9 | 5.2 | 0.40 |
| 60 | Example 60 | 3,200 | 145 | 98.1 | 4.1 | 0.43 |
| 61 | Example 61 | 3,000 | 130 | 98.0 | 5.2 | 0.41 |
| 62 | Example 62 | 2,900 | 145 | 97.9 | 4.8 | 0.39 |
| 63 | Example 63 | 3,000 | 130 | 98.0 | 4.8 | 0.41 |
| 64 | Example 64 | 3,100 | 148 | 98.0 | 5.2 | 0.40 |
| 65 | Example 65 | 2,800 | 140 | 97.4 | 6.8 | 0.38 |
| 66 | Example 66 | 2,900 | 132 | 97.6 | 6.5 | 0.39 |
| 67 | Example 67 | 2,900 | 116 | 97.6 | 6.0 | 0.39 |
| 68 | Example 68 | 4,000 | 160 | 98.1 | 4.1 | 0.42 |
| 69 | Example 69 | 3,900 | 170 | 98.0 | 3.8 | 0.38 |
| 70 | Example 70 | 3,900 | 156 | 98.2 | 4.5 | 0.38 |
| 71 | Example 71 | 3,800 | 146 | 97.9 | 4.4 | 0.40 |

APPLIED EXAMPLE 72

Gaseous-phase Polymerization of Propylene

In an autoclave having an inner volume of 5 liters and provided with a stirrer, 150 g of polypropylene powder dried in advance under a flow of nitrogen gas at 90° C. for four hours was placed. To this autoclave, with the stirrer thereof operated at 150 rpm, the same catalyst component as prepared in Example 3 was fed at a rate of 50 mg/hr, TEAL at a rate of 0.7 mmol/hr, PES at a rate of 0.05 mmol/hr, propylene at a rate of 130 g/hr, and hydrogen gas at a rate of 15 ml/hr for continuous polymerization of propylene under the conditions of 70° C. of temperature and 20 kg/cm² of pressure, with the product of polymerization continuously withdrawn from the autoclave. Consequently, there was obtained polypropylene powder at a rate of 90 g/hr. The polymer so produced was found to have an MFR of 5.2 g/10 min and an HI of 96.8%.

APPLIED EXAMPLE 73

Block Copolymerization of Propylene

In an autoclave having an inner volume of 1.5 liters and provided with a stirrer, a reaction mixture obtained by mixing 30.0 mg of the catalyst component prepared by the procedure of Example 3, 0.75 ml of n-heptane solution of TEAL (1 mol/liter), and 0.75 ml of n-heptane solution of PES (0.1 mol/liter) and allowing the resultant mixture to stand for five minutes was placed under a blanket of nitrogen gas. Then, 100 ml of hydrogen gas and 1 liter of liquefied propylene were introduced therein under pressure. The reaction system consequently formed was heated to 70° C. to effect homopolymerization of propylene for one hour. In an experiment of polymerization performed parallelly under the same conditions, the polypropylene obtained was found to have a HI of 98.1%. After completion of the polymerization, the unaltered propylene was purged and the interior of the autoclave was displaced with nitrogen gas. Then, a mixed gas of ethylene and propylene [ethylene/propylene=1.5 (by mol ratio)] was introduced at such a rate as to keep the monomer gas pressure at 1.5 atmospheres. Under these conditions, copolymerization was effected at 70° C. for three hours. After completion of the polymerization, the unaltered mixed gas was discharged. Consequently, there was obtained 175 g of block copolymer of propylene.

The proportion of the copolymer fraction calculated based on the consumed amount of the mixed gas and the total amount of polymer was found to be 26.3% and the ethylene content in the total polymer was found by infrared spectral analysis to be 12.6%. Thus, the ethylene content in the copolymer fraction is found by calculation to have been 48%. The amount of the homopolymer of propylene per g of the catalyst component found based on the amount of the total polymer and the consumed amount of the mixed gas was found to be 4,300 g and the amount of the copolymer fraction formed to be 1,530 g. The block copolymer so produced was found to have a MFR of 2.9 g/10 min and a bulk density of 0.44 g/cm³. The polymer particles were free from cohesion and showed absolutely no sign of fouling in the autoclave.

APPLIED EXAMPLE 74

Random Copolymerization of Propylene and Ethylene

During the polymerization of propylene in the procedure of Applied Example 1, 0.6 g of ethylene was introduced under pressure into the autoclave six times at intervals of 10 minutes to effect random copolymerization of propylene and ethylene. After completion of the polymerization, the unaltered monomers were discharged from the polymerization system. Consequently, there was obtained 136 g of a random copolymer of propylene and ethylene. The ethylene content in the produced copolymer was found by infrared spectral analysis to be 2.7%. The amount of the copolymer formed per 1 g of the catalyst component was 4,500 g. The produced copolymer was found to have a MFR of 12.4 g/10 min and a bulk density of 0.43 g/cm³.

APPLIED EXAMPLE 75

Polymerization of 1-Butene

By following the procedure of Applied Example 1, except using 205 mg of the catalyst component obtained in Example 3, 400 ml of isobutane as a medium, and 400 ml of 1-butene (liquid) in the place of liquefied propylene and carrying out the polymerization under the conditions of 40° C. of temperature and five hours of duration, 1-butene was polymerized. Consequently, there was obtained 307.3 g of powdery poly-1-butene. The value, Kc, was found to be 1,500 g/g of catalyst component. The produced polymer was found to have a MFR of 4.1 g/10 min, a bulk density of 0.41 g/cm³, and an ether insolubles content (residue after five hours' extraction from boiling diethyl ether) of 99.3%.

APPLIED EXAMPLE 76

Polymerization of 4-methyl-1-pentene

By following the procedure of Applied Example 75, except using 230 mg of the catalyst component obtained by Example 3 and 400 ml of 4-methyl-1-pentene in the place of 1-butene, 4-methyl-1-pentene was polymerized. Consequently, there was obtained 312.5 g of powdery poly-4-methyl-1-pentene. The value, Kc, was found to be 1,360 g/g of catalyst component. The produced polymer was found to have a MFR of 3.5 g/10 min, a bulk density of 0.38 g/cm³, and an ether insolubles content of 98.5%.

What is claimed is:

1. A titanium containing supported catalyst component for use in the polymerization of alpha-olefins having three or more carbon atoms comprising the product obtained by contacting
   (1) a reaction product comprising
      (a) a metal oxide or a composite of metal oxides of Group II, III, or IV of the Periodic Table,
      (b) a dihydrocarbyl magnesium compound, mixtures thereof or a complex with an organic compound of aluminum, boron, beryllium, or zinc, and
      (c) a chlorine-containing monohydric or polyhydric alcohol, with
   (d) an electron-donating compound selected from the group consisting of carboxylic acids, carboxylic acid anhydrides, carboxylic acid esters, carboxylic acid halides, alcohols and ethers and
   (e) a tetravalent titanium compound.

2. The titanium containing supported catalyst component of claim 1 wherein the metal oxide is SiO₂.

3. The titanium containing supported catalyst component of claim 1 wherein the dihydrocarbyl magnesium compound is represented by the general formula RMgR' wherein R and R', which can be the same or different is an alkyl group having from 1 to 20 carbon atoms.

4. The titanium containing supported catalyst component of claim 3 wherein the dihydrocarbyl magnesium compound is n-butylethyl magnesium.

5. The titanium containing supported catalyst component of claim 1 wherein the titanium compound is titanium tetrachloride and the olefin has from 3 to 6 carbon atoms.

6. The titanium containing supported catalyst component of claim 1 wherein the electron-donating compound is selected from the group consisting of carboxylic acids, carboxylic acid anhydrides, carboxylic acid ester and carboxylic acid halides.

7. The titanium containing supported catalyst component of claim 6 wherein the electron-donating compound is a carboxylic acid ester.

8. The titanium containing supported catalyst component of claim 1 wherein the chlorine-containing alcohol is 2,2,2-trichloroethanol.

9. A titanium containing supported catalyst component for use in the polymerization of alpha-olefins having three or more carbon atoms comprising the product obtained by contacting
   (1) a reaction product comprising
      (a) SiO₂,
      (a) n-butylethyl magnesium, and
      (c) 2,2,2-trichloroethanol, with
   (2)
      (d) di-n-butylphthalate, and
      (e) titanium tetrachloride.

10. The titanium containing supported catalyst component of claim 9 wherein the product is treated a second time with titanium tetrachloride.

11. The titanium containing supported catalyst component of claim 10 wherein the product is washed with toluene prior to the second contact with titanium tetrachloride.

12. The titanium containing supported catalyst component of claim 9 wherein the contacting of component (a), (b), and (c) is carried out at a temperature in the range of −20° C. to +150° C. for a period of 0.1 to 100 hours, the ratios of (a), (b), and (c) are such that (b)/(a) is in the range of 0.01 to 10, (c)/(a) is in the range of 0.01 to 10, and (c)/(b) is in the range of 0.1 to 20, the contact product of (a), (b), and (c) is contacted with the component (d) and (e) by mechanically comminuting or stirring at a temperatur in the range of 0° C. to 200° C. for a period of 0.1 to 100 hours and the compound (d) is imployed in the range of 0.05 to 10 gram mols per gram atom of magnesium in the reaction product of (1) and the amount of (e) component is in the range of 1 to 50 gram mols per gram atom of magnesium in the reaction product of (1).

13. The titanium containing supported catalyst component of claim 1 wherein the contacting of component (a), (b), and (c) is carried out at a temperature in the range of −20° C. to +150° C. for a period of 0.1 to 100 hours, the ratios of (a), (b), and (c) are such that (b)/(a) is in the range of 0.01 to 10, (c)/(a) is in the range of 0.01 to 10, and (c)/(b) is in the range of 0.1 to 20, the contact product of (a), (b), and (c) is contacted with the component (d) and (e) by mechanically comminuting or stirring at a temperature in the range of 0° C. to 200° C. for a period of 0.1 to 100 hours and the compound (d) is employed in the range of 0.05 to 10 gram mols per gram atom of magnesium in the reaction product of (1) and the amount of (e) component is in the range of 1 to 50 gram mols per gram atom of magnesium in the reaction product of (1).

14. A catalyst system for the polymerization of olefins comprising
   (A) the titanium containing supported catalyst component of claim 1 and
   (B) an organo metallic compound of Group I through III.

15. A catalyst system for the polymerization of olefins comprising (A) the titanium containing supported catalyst component of claim 2 and
(B) an organo metallic compound of Group I through III.

16. A catalyst system for the polymerization of olefins comprising
(A) the titanium containing supported catalyst component of claim 3
(B) an organo metallic compound of Group I through III.

17. A catalyst system for the polymerization of olefins comprising
(A) the titanium containing supported catalyst component of claim 1 and
(B) an organo metallic compound of Group I through III.

18. A catalyst system for the polymerization of olefins comprising
(A) the titanium containing supported catalyst component of claim 10 and
(B) an organo metallic compound of Group I through III.

19. A titanium containing supported catalyst component for use in the polymerization of alpha-olefins having from 3 to 6 carbon atoms comprising the product obtained by contacting
(1) a reaction product effected by stirring or by mechanically comminuting
    (a) silica,
    (b) a dialkyl magnesium compound wherein the alkyl groups can be the same or different and each alkyl group can have from 1 to 20 carbon atoms, and
    (c) a chlorine-containing monohydric or polyhydric alcohol, with
(2)
    (d) one of an aromatic carboxylic acid ester, aromatic carboxylic acid halide, aromatic carboxylic acid and aromatic carboxylic acid anhydride, and
    (e) titanium tetrachloride.

20. The titanium containing supported catalyst component of claim 19 wherein the contacting of component (a), (b), and (c) is carried out at a temperature in the range of $-20°$ C. to $+150°$ C. for a period of 0.1 to 100 hours, the ratios of (a), (b), and (c) are such that (b)/(a) is in the range of 0.01 to 10, (c)/(a) is in the range of 0.01 to 10, and (c)/(b) is in the range of 0.1 to 20, the contact product of (a), (b), and (c) is contacted with the component (d) and (e) by mechanically comminuting or stirring at a temperatur in the range of $0°$ C. to $200°$ C. for a period of 0.1 to 100 hours and the compound (d) is employed in the range of 0.05 to 10 gram mols per gram atom of magnesium in the reaction product of (1) and the amount of (e) component is in the range of 1 to 50 gram mols per gram atom of magnesium in the reaction product of (1).

\* \* \* \* \*